(12) United States Patent
Kuo et al.

(10) Patent No.: US 9,170,448 B2
(45) Date of Patent: Oct. 27, 2015

(54) DISPLAY APPARATUS

(75) Inventors: Feng-Wei Kuo, Pingtung County (TW); Ko-Ruey Jen, Taipei (TW); Chia-Hua Yu, Taipei County (TW); I-Fang Wang, Changhua County (TW)

(73) Assignee: HANNSTAR DISPLAY CORP., New Taipei (TW)

( * ) Notice: Subject to any disclaimer, the term of this patent is extended or adjusted under 35 U.S.C. 154(b) by 793 days.

(21) Appl. No.: 13/533,425

(22) Filed: Jun. 26, 2012

(65) Prior Publication Data

US 2013/0187865 A1    Jul. 25, 2013

(30) Foreign Application Priority Data

Jan. 19, 2012  (CN) .......................... 2012 1 0017711

(51) Int. Cl.
*G02F 1/1335* (2006.01)
*G02F 1/1333* (2006.01)
*G02F 1/1343* (2006.01)

(52) U.S. Cl.
CPC ...... *G02F 1/13338* (2013.01); *G02F 1/133512* (2013.01); *G02F 1/134363* (2013.01); *G02F 2001/134372* (2013.01); *G02F 2202/22* (2013.01)

(58) Field of Classification Search
CPC ................... G02F 1/133512; G02F 1/136209; G02F 1/1339; G02F 2001/133388; G02F 1/133514; G02F 1/133516; G02F 1/134363; G02F 1/133707; G02F 1/136213; G02F 1/13338; G06F 3/0412; G06F 3/045
USPC ............................................. 349/12, 110, 141
See application file for complete search history.

(56) References Cited

U.S. PATENT DOCUMENTS 8,052,498 B2 * 11/2011 Chien et al. ..................... 445/24
2011/0170043 A1 * 7/2011 Lim et al. ...................... 349/116

FOREIGN PATENT DOCUMENTS

| CN | 101713883 A | 5/2010 |
|----|-------------|--------|
| CN | 102135675 A | 7/2011 |
| JP | 2003-075819 A | 3/2003 |

OTHER PUBLICATIONS

Office Action of the corresponding PRC Patent application issued on Jan. 29, 2015 2015 from the PRC Patent Office.

* cited by examiner

*Primary Examiner* — Mike Qi
(74) *Attorney, Agent, or Firm* — Volpe and Koenig, P.C.

(57) ABSTRACT

A display apparatus includes a transparent substrate, a transparent matrix layer, a black matrix layer and a conductive layer. The transparent matrix layer is disposed above the transparent substrate. The black matrix layer is disposed below the transparent substrate. The conductive layer is disposed between the transparent substrate and the black matrix layer.

20 Claims, 6 Drawing Sheets

//DISPLAY APPARATUS

CROSS REFERENCE TO RELATED APPLICATIONS

The application claims the benefit of China Patent Application No. 201210017711.0, filed on Jan. 19, 2012, at the China State Intellectual Property Office, the disclosures of which are incorporated herein in their entirety by reference.

FIELD OF THE INVENTION

The present invention relates to a display apparatus and the manufacturing method thereof, especially to a liquid crystal display apparatus and the manufacturing method thereof.

BACKGROUND OF THE INVENTION

Currently the liquid crystal displays (LCDs) have been dominating in almost all the major display markets for several applications, such as monitors, mobile phones, televisions, notebook computers, tablet personal computers (PCs), global positioning system (GPS) devices, portable video players, as the technologies of the LCD have been developing widely, deeply and quickly.

The liquid crystals play the role of light valves to control the light transmission and the light blocking at instantaneous display time in each pixel of the LCD. In the view of the control mechanisms of the liquid crystals, the LCD can be divided into the types of the vertical alignment (VA) and the plane switching.

The VA type can be further divided into several sub-types. Generally, the VA type LCD has very fast response time for the liquid crystals, and is especially suitable for displaying the video showing very fast movements. However, when the user presses the LCD screen by fingers or other objects, the vortex-shaped pattern appears at the place being pressed on the screen of the LCD, because the distance interval of the vertical alignment of the liquid crystals is shortened by such vertically pressing on the screen. In this aspect, the VA LCD is not suitable to be used for the touch-panel display, since the screen of the touch-panel display tends to be frequently touched and pressed by the user's finger, and the displayed picture thereof will be blurred anywhere is being touched.

On the other hand, the plane switching type LCDs, including the in-plane switching (IPS) and the fringe field switching (FFS) LCDs, do not have this kind of problem, and provide good performance for the touch-panel display, since the liquid crystal alignments thereof occur in the plane (horizontal) direction rather than the vertical direction.

The electric field of the plane switching type LCD is generated and driven in the horizontal direction, so the plane switching type LCD can also be classified as a horizontal electric field driving LCD. Since the electric field of the horizontal electric field driving LCD is generated and driven in the horizontal direction, all the positive and negative electrodes are fabricated on the bottom glass, which is located below the liquid crystal cells. In contrast, in VA type LCD, the positive and negative electrodes are located on the top glass above the liquid crystal cells and the bottom glass below the liquid crystal cells, respectively. Thus, the horizontal electric field driving LCD tends to have the electrostatic issue. The current solution to this issue is made by coating an indium tin oxide (ITO) layer on the outer or inner surface of the top glass, i.e. the outmost glass to the viewer. FIG. 1 shows a cross-sectional view of a sub-pixel of an FFS LCD 10 in the prior art. In FIG. 1, the structure of positive and negative electrodes are formed on the bottom glass 12, and the transparent ITO layer 13 is coated on the upper surface, i.e. outer surface, of the top glass 11. Since the ITO layer 13 is electrically conductive, electrostatic charges would not accumulate.

However, as the display devices are going to the style with the slim design, it is required to reduce the thickness of the glass used, and usually the glass needs to be ground and polished or the thinner glass needs to be adopted. In such conditions, the glass 11 coated with the ITO layer 13 in the LCD 10 in the prior art as shown in FIG. 1 can not be ground and polished. Besides, if the glass 11 is ground and polished to reduce its thickness at first and then coated with the ITO layer 13, usually the glass 11 would break. Thus, it is difficult to attain both the slim design and antistatic effect for the horizontal electric field driving LCD, and an effective solution is urgently required.

For overcoming the above-mentioned problem existing in the conventional techniques, the novel display apparatus with both the slim design and antistatic effect are developed to solve the above-mentioned problem, after the deep analyses, researches and plenty of experiments by the inventor.

SUMMARY OF THE INVENTION

The present invention provides the display apparatus with both the slim design and antistatic effect and the manufacturing method thereof.

In accordance with one aspect of the present invention, a display apparatus is provided. This display apparatus includes a transparent substrate, a transparent matrix layer, a black matrix layer and a conductive layer. The transparent matrix layer is disposed above the transparent substrate. The black matrix layer is disposed below the transparent substrate. The conductive layer is disposed between the transparent substrate and the black matrix layer.

In accordance with another aspect of the present invention, a display apparatus is provided. This display apparatus comprises a transparent substrate, a black matrix layer and a conductive layer. The black matrix layer has a profile. The conductive layer is disposed between the transparent substrate and the black matrix layer, directly contacts the transparent substrate, and has a projection onto the black matrix layer, wherein the projection has a profile disposed within that of the black matrix.

In accordance with a further aspect of the present invention, a display apparatus is provided. This display apparatus comprises a transparent substrate, a black matrix layer and a conductive matrix layer. The conductive matrix layer is disposed between the transparent substrate and the black matrix layer, and directly contacts the transparent substrate.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
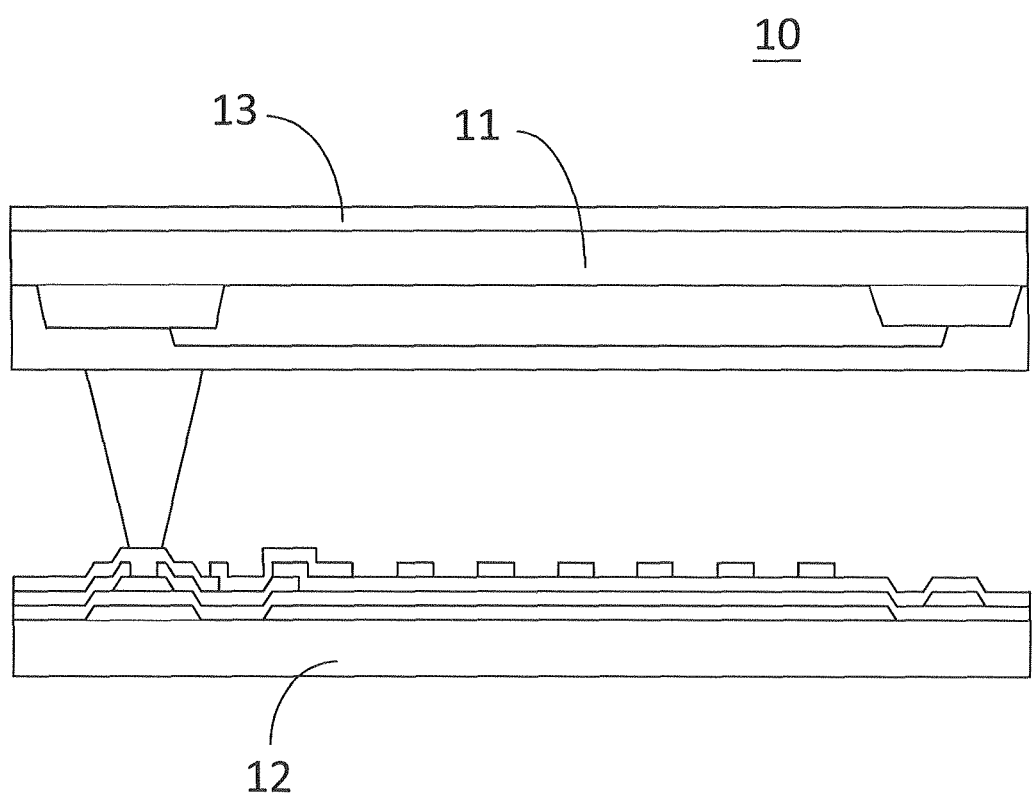
FIG. 1 is the schematic diagram showing a cross-sectional view of a sub-pixel in a conventional FFS LCD of the prior art.
Figure 2A:
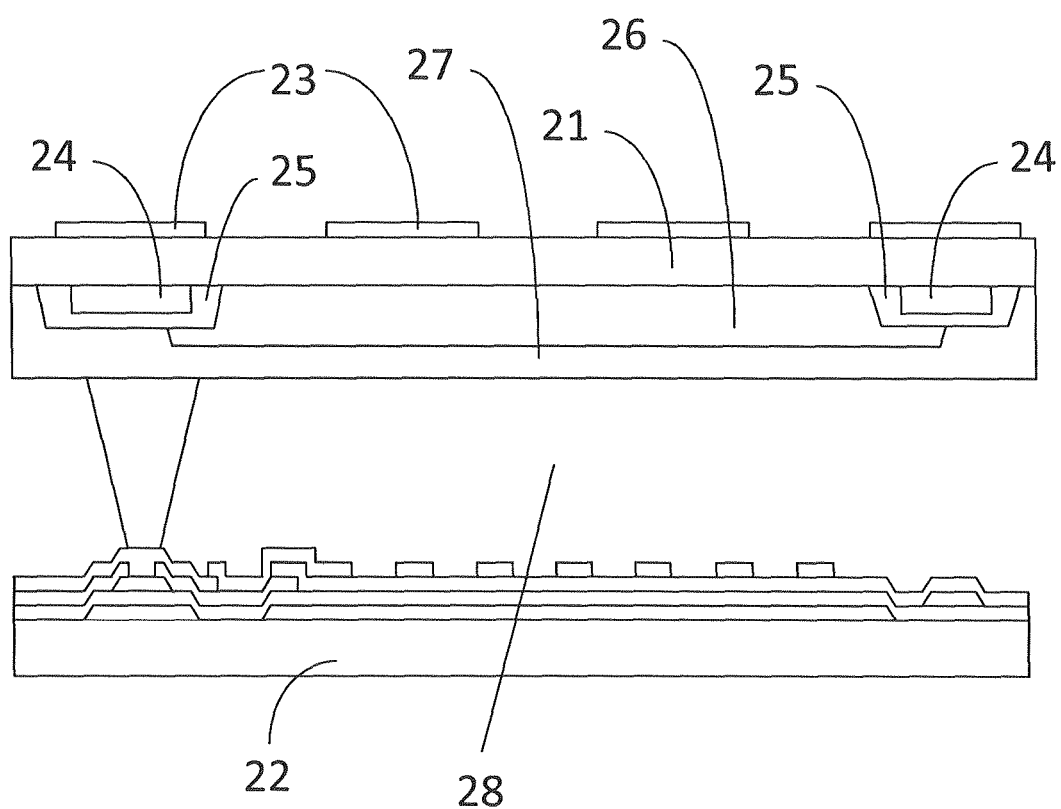
FIG. 2A is the schematic diagram showing a cross-sectional view of a display apparatus in one embodiment of the present invention.

FIG. 2A shows a cross-sectional view of a display apparatus in one embodiment of the present invention. In FIG. 2A, the display apparatus 20 includes a transparent substrate 21, a black matrix layer 25 and a conductive matrix layer 24, wherein the conductive matrix layer 24 is disposed between the transparent substrate 21 and the black matrix layer 25, and directly contacts the transparent substrate 21. Since conductive matrix 24 is electrically conductive and directly contacts the transparent substrate 21, no electrostatic charge would accumulate on the transparent substrate 21 so that the display apparatus 20 has an antistatic function. On the other hand, since contact area between the conductive matrix layer 24 and the transparent substrate 21 occupies relatively small portion of the whole surface area of the transparent substrate 21, the transparent substrate 21 would not break easily after the reduction of its thickness. In the comparison with the prior art, tough the display apparatus in the prior art with the glass fully coated with a transparent conductive layer, e.g. ITO layer, can have the antistatic function, the glass therein tends to easily break after the reduction of its thickness, and thus the display apparatus in the prior art cannot be designed with the slim type. Therefore, present embodiment can overcome the drawback of the prior art, and is able to simultaneously have the slim type design and antistatic function to meet the great demands of the markets.

Figure 2B:
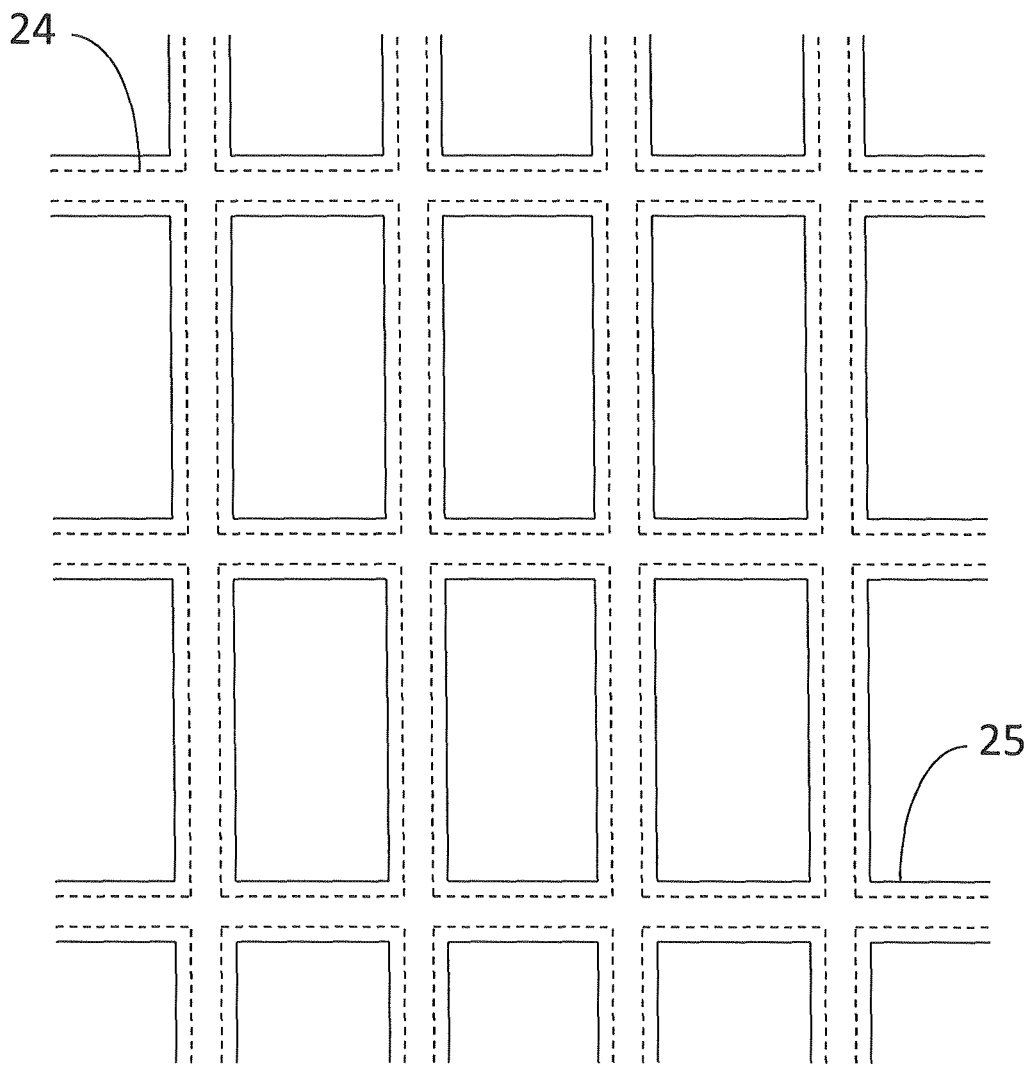
FIG. 2B is the schematic diagram showing a top view of the conductive matrix layer and black matrix layer in the display apparatus of FIG. 2A.

FIG. 2B shows a top view of the conductive matrix layer 24 and black matrix layer 25 in the display apparatus 20 of FIG. 2A. In FIG. 2B, the conductive matrix layer 24 is disposed above the black matrix layer 25, and the profile of the projection of the conductive matrix layer 24 onto the black matrix layer 25 is completely disposed within the profile of the black matrix layer 25. That is to say, the locations of the conductive matrix layer 24 are completely disposed right above those of the black matrix layer 25. Of course, it is feasible that the locations of the conductive matrix layer 24 are not completely disposed right above those of the black matrix layer 25 based on the concept of the present invention, and the slim design and antistatic function can still be reached.

When the display apparatus 20 is an FFS LCD, the positive and negative electrodes are located below the liquid crystals and on the bottom transparent substrate. However, the conductive matrix layer 24 above the liquid crystals is electrically conductive, and may slightly influence the switching directions of the liquid crystals right below the conductive matrix layer 24, and this condition may cause undesired phenomena of slight light leaking and slight color deviation. When the conductive matrix layer 24 is completely disposed right above the black matrix layer 25, since the black matrix layer 25 itself is used to block the light, the light coming from the location right below the conductive matrix layer 24 will be blocked. Therefore, the design shown in FIG. 2B never influences the display performance of LCD. In addition, the black matrix layer 25 itself is usually a necessary component used to partition the color filters with different colors, e.g. red, green and blue colors, so the design shown in FIG. 2B never reduces the original total brightness of the LCD, either.

It can be seen in FIG. 2A that the display apparatus 20 can optionally include a color filter 26, which is disposed below the transparent substrate 21 and in the vacancy of the black matrix layer 25, and directly contacts the transparent substrate 21. A cover layer 27 can be optionally included and disposed below the color filter 26 and the black matrix layer 25. The cover layer 27 can directly contact and fully cover the color filter 26 and the black matrix layer 25 to allow the structure to become even and flat, so the liquid crystals in the liquid crystal cell 28 would not be affected by an uneven structure when switching. Refer to FIG. 2A again. A transparent matrix layer 23 and a touch sensing structure (not shown in the figures) can be optionally included and disposed above the transparent substrate 21. The touch sensing structure includes the transparent matrix 23 to allow the display apparatus 20 to have the touch control function. Since the designs of LCDs are quite diversified, the above-mentioned elements or structures in this paragraph can be appropriately adjusted according to the practical requirements and would be still within the concept of the present invention.

In addition, the display apparatus 20 in the above embodiments can optionally include a conductive object (not shown in the figures), which can be located at the edge of the display apparatus 20, contact the conductive matrix layer 24, and be electrically grounded to enhance the antistatic function of the display apparatus 20. The conductive object can include one selected from the group consisting of a gold pellet, silver pellet, tin pellet, silver paste, transparent conductive glue and the combination thereof. The electrical grounding method for the conductive object can be accomplished by connecting the conductive object with a ground end (not shown in the figures), an array common TIO layer (not shown in the figure), or a constant reference voltage terminal (not shown in the figures) to reach the ground effect and to enhance the antistatic function of the transparent substrate 21. If the display apparatus is a horizontal electric field driving LCD, the above-mentioned array common ITO layer is usually located on the bottom transparent substrate 22.

The above-mentioned transparent substrate 21 can be a glass substrate or a plastic substrate. The above transparent matrix layer 23 can be a transparent conductive layer, and directly contact the transparent substrate 21. Optionally, the conductive matrix layer 24 can directly contact both the transparent substrate 21 and the black matrix layer 25, and the lateral surfaces and the bottom surface of the above conductive matrix layer 24 can be covered by the black matrix layer 25. The conductive matrix layer 24 can be a transparent conductive layer or a metal layer. The material of the above transparent conductive layer can be selected from the group consisting of ITO, indium oxide, tin oxide, a zinc oxide and the combination thereof. The above display apparatus 20 can be optionally a horizontal electric field driving LCD, e.g. in-plane switching (IPS) LCD, fringe field switching (FFS) LCD, etc.

Figure 3A:
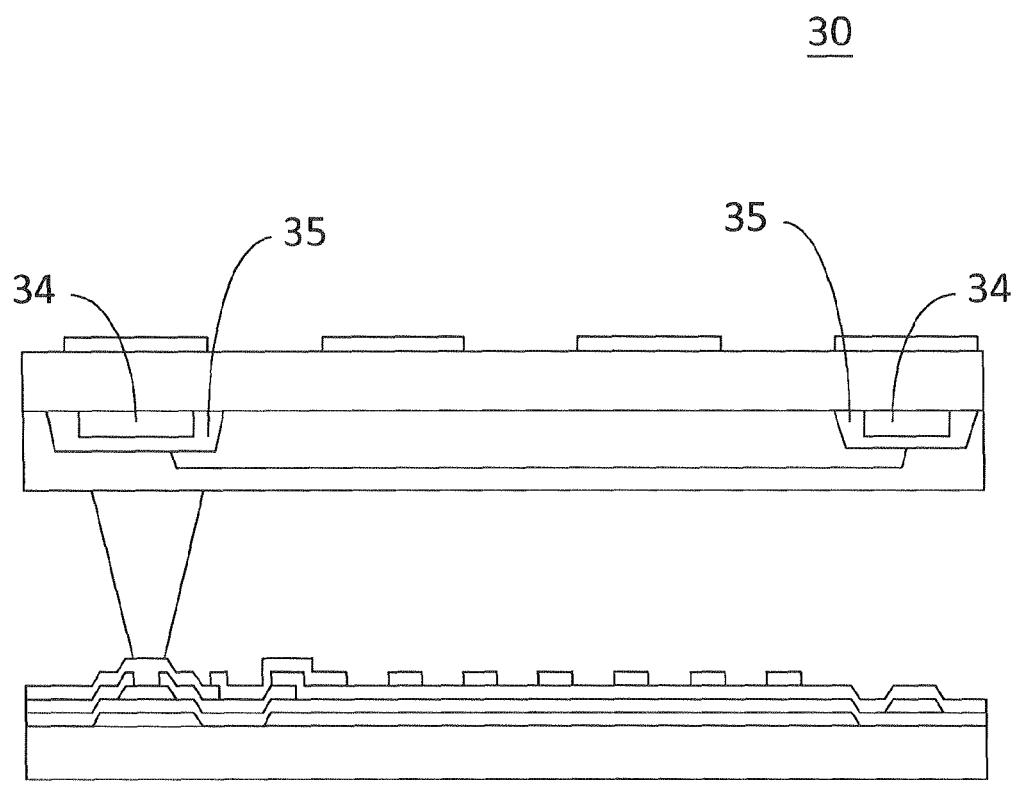
FIG. 3A is the schematic diagram showing a cross-sectional view of a display apparatus in another embodiment of the present invention.
Figure 3B:
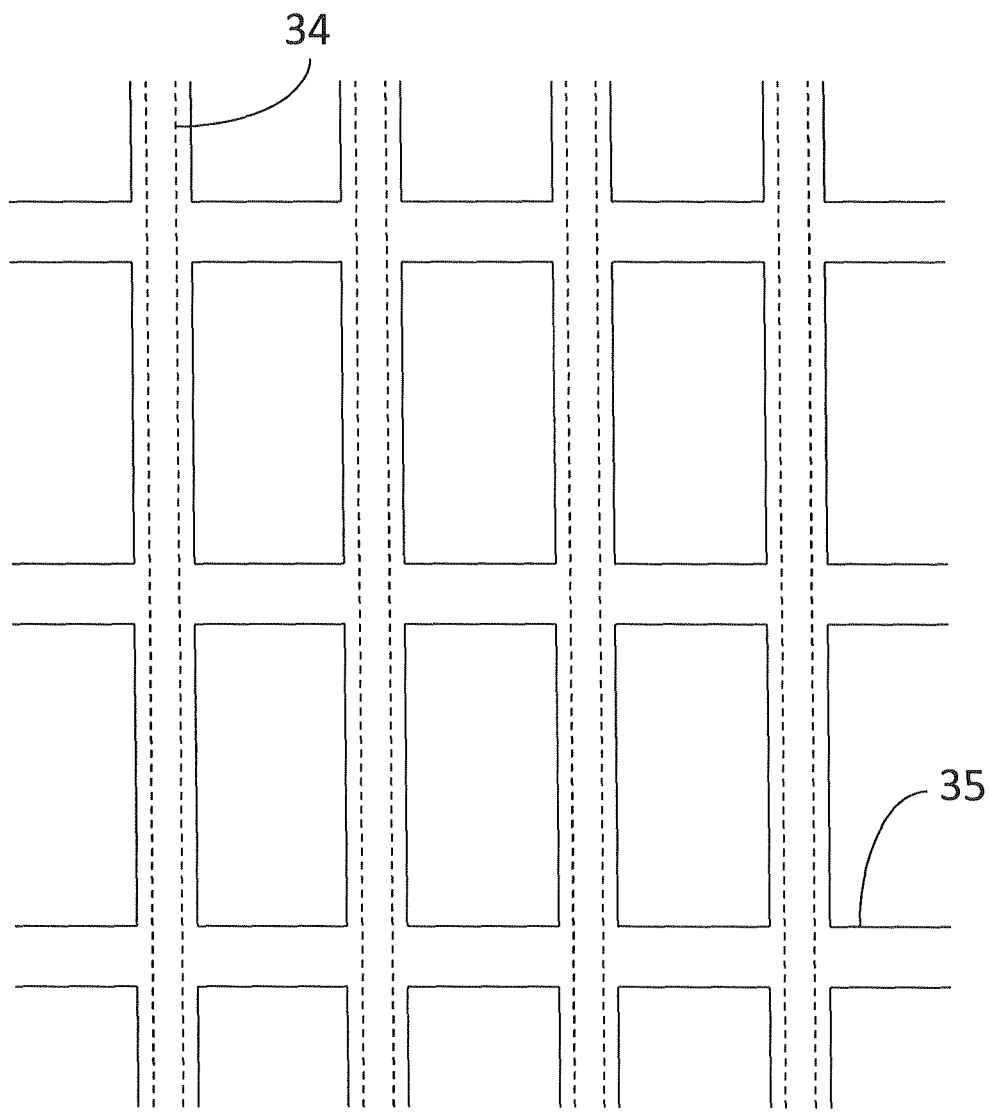
FIG. 3B is the schematic diagram showing a top view of the conductive layer and black matrix layer in the display apparatus of FIG. 3A.

FIG. 3A shows a cross-sectional view of a display apparatus in another embodiment of the present invention. In FIG. 3A, the display apparatus 30 includes a transparent substrate 31, a black matrix layer 35 and a conductive layer 34, where the conductive layer 34 is disposed between the transparent substrate 31 and the black matrix layer 35, and directly contacts the transparent substrate 31. FIG. 3B shows a top view of the conductive layer 34 and black matrix layer 35 in the display apparatus of FIG. 3A. It can be seen from the top view in FIG. 3B that the profile of the projection of the conductive layer 34 onto the black matrix layer 35 is located within the profile of the black matrix layer 35, and the shape of the conductive layer 34 is formed by plural parallel straight lines, which are different from the matrix shape of the conductive matrix layer 24 shown in FIG. 2B. Actually the size of each sub-pixel in the LCD is quite tiny, and the perpendicularly cross lines, i.e. the lines forming the matrix, of the black matrix layer 35 are quite dense, so the plural parallel lines of the conductive layer 34 in this embodiment can provide excellent antistatic function. For example, the display apparatus with full high definition (full HD) has 1920×1080 pixels, a worldwide digital standard, and generally each pixel contains three sub-pixels for red, green and blue colors. Thus, the parallel lines in the conductive layer 34 can as high as 3240 (=1080×3) lines or 5760 (=1920×3) lines. In this embodiment, the profile of the projection of the conductive layer 34 onto the black matrix layer 35 is located within the profile of the black matrix layer 35. Thus, as the above description, similarly the conductive layer 34 neither influences the display quality of the LCD nor reduces the total brightness of the LCD, and both the antistatic function and the slim design can be simultaneously accomplished for the display apparatus in this embodiment.

Certainly, based on the concept of the present invention, the shape of the conductive layer for providing the antistatic function, in addition to the matrix shape of the conductive matrix layer 24 shown in FIG. 2B and the parallel linear shape of the conductive layer 34 shown in FIG. 3B, can be flexibly designed to be any shape formed by plural lines, connections of plural dots or lumps, or the combination thereof as long as their densities are high enough to provide antistatic function.

Besides, the profile of the projection of the conductive layer, e.g. the conductive matrix layer 24 in FIG. 2B or the conductive layer 34 in FIG. 3B, with the antistatic function onto the black matrix layer can be located within or outside the profile of the black matrix layer. When within the profile of the black matrix layer, since the black matrix layer has the function of blocking light, even though the phenomena of slight light leaking or slight color variation occur due to the influence by the electric field on the orientation of the liquid crystals right below the conductive layer, the display quality still would not be affected owing to the light blocking function of the black matrix layer.

Figure 4:
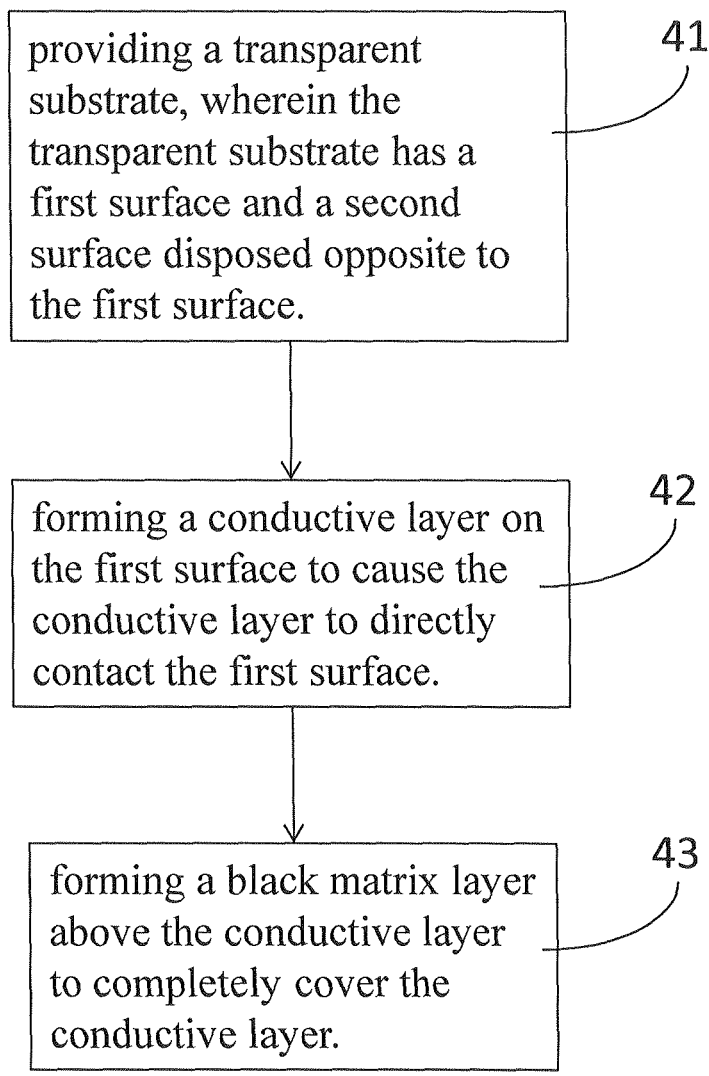
FIG. 4 is the schematic diagram showing a method for manufacturing a display apparatus in one embodiment of the present invention.

FIG. 4 shows a flowchart of a method for manufacturing a display apparatus in one embodiment of the present invention. In FIG. 4, the step 41 of providing a transparent substrate is performed, wherein the transparent substrate has a first surface and a second surface, which is disposed opposite to the first surface. Then the step 42 of forming a conductive layer on the first surface to cause the conductive layer to directly contact the first surface is followed. Finally, the step of 43 of forming a black matrix layer above the conductive layer to completely cover the conductive layer is performed.

In the embodiment of FIG. 4, since the conductive layer is electrically conductive and directly contacts the first surface of the transparent substrate, no electrostatic charge would accumulate on the transparent substrate so that the transparent substrate has an antistatic function. On the other hand, since the black matrix layer is formed above the conductive layer and completely covers the conductive layer, similarly, even though the phenomena of slight light leaking or slight color variation occur due to the influence by the electric field on the orientation of the liquid crystals right below the conductive layer, the display apparatus in this embodiment still has the advantage of maintaining the high display quality owing to the light blocking function of the black matrix layer.

The manufacturing method shown in FIG. 4 can be applied to manufacture the display apparatus shown in FIG. 2A or 3A. It is worth to pay attention that the structures shown in FIG. 2A or 3A is the structure after the assembly, wherein the conductive matrix layer 24 or the conductive layer 34 is disposed above the black matrix layer 25 or 35; while in the manufacturing method shown in FIG. 4, the conductive layer is formed on the transparent substrate first, and then the black matrix layer is formed on the conductive layer. That is, the upper conductive matrix layer 24 in FIG. 2A or the upper conductive layer 34 in FIG. 3A is manufactured first, and after then the lower black matrix layer 25 or 35 is manufactured.

The method shown in FIG. 4 can further optionally include the following steps: forming a transparent matrix layer on the second surface of the transparent substrate to cause the transparent matrix layer to directly contact the second surface; forming a touch sensing structure above the second surface so that the display apparatus can have the touch control function, wherein the touch sensing structure includes the transparent matrix layer; disposing a color filter in the vacancies of the black matrix layer to allow the color filter to directly contact the transparent substrate; forming a cover layer directly covering the color filter and the black matrix layer; forming liquid crystal cells adjacent to the cover layer; and forming a conductive object, which is disposed on the edge of the display apparatus, contacts the conductive layer, and is electrically grounded so as to enhance the antistatic function of the display apparatus Similarly, the electrical grounding method for the conductive object can be accomplished by connecting the conductive object with a ground end, an array common TIO layer in the display apparatus, or a constant reference voltage terminal to reach the ground effect and to enhance the antistatic function of the transparent substrate.

In the embodiment of FIG. 4, the step of forming the black matrix layer can optionally allow the black matrix layer to directly contact the conductive layer and optionally allow the lateral surfaces and the bottom surface of the conductive layer to be covered by the black matrix layer. In this embodiment, the transparent substrate can be a glass substrate or a plastic substrate. The material of the transparent matrix layer in this embodiment can be can be selected from a group consisting of ITO, indium oxide, tin oxide, a zinc oxide and the combination thereof. The conductive layer can be a transparent conductive layer, a metal layer or a combination layer, and the material of the transparent conductive layer can be selected from a group consisting of ITO, indium oxide, tin oxide, a zinc oxide and the combination thereof. The conductive object can include one selected from the group consisting of a gold pellet, silver pellet, tin pellet, silver paste, transparent conductive glue and the combination thereof. The display apparatus can be optionally a horizontal electric field driving LCD, e.g. in-plane switching (IPS) LCD, fringe field switching (FFS) LCD, etc.

On the other hand, in all the above embodiments, the conductive layer or the conductive matrix layer is in direct contact with the transparent substrate. Actually, based on the concept of the present invention, the above conductive layer or the conductive matrix layer is allowed not to directly contact the transparent substrate, but is intervened with one or multiple semiconductor layers or insulating layers. If the insulating layer is introduced, the total thickness thereof must be thin enough so as to avoid the affection on the antistatic effect.

Some embodiments of the present invention are described in the followings.

1. A display apparatus comprises a transparent substrate; a transparent matrix layer disposed above the transparent substrate; a black matrix layer disposed below the transparent substrate; and a conductive layer disposed between the transparent substrate and the black matrix layer.

2. A display apparatus comprises a transparent substrate; a black matrix layer having a profile; and a conductive layer disposed between the transparent substrate and the black matrix layer, directly contacting the transparent substrate, and having a projection onto the black matrix layer, wherein the projection has a profile disposed within that of the black matrix.

3. A display apparatus comprises a transparent substrate; a black matrix layer; and a conductive matrix layer disposed between the transparent substrate and the black matrix layer, and directly contacting the transparent substrate.

4. A display apparatus of any one of the above embodiments further comprises a transparent matrix layer disposed above the transparent substrate.

5. A display apparatus of any one of the above embodiments further comprises a touch sensing structure disposed above the transparent substrate and including the transparent matrix layer so that the display apparatus provides a touch control function.

6. In a display apparatus of any one of the above embodiments, the black matrix layer has a vacancy therein.

7. A display apparatus of any one of the above embodiments further comprises a color filter disposed below the transparent substrate and in the vacancy of the black matrix layer, and directly contacting the transparent substrate.

8. A display apparatus of any one of the above embodiments further comprises a cover layer disposed below and directly contacting the color filter and the black matrix layer.

9. A display apparatus of any one of the above embodiments further comprises a liquid crystal cell disposed below the cover layer.

10. A display apparatus of any one of the above embodiments has an edge.

11. A display apparatus of any one of the above embodiments further comprises a conductive object disposed at the edge, contacting the conductive layer, electrically grounded, and including one selected from a group consisting of a gold pellet, a silver pellet, a tin pellet, a silver paste, a transparent conductive glue and a combination thereof.

12. In a display apparatus of any one of the above embodiments, the transparent substrate includes one of a glass substrate and a plastic substrate.

13. In a display apparatus of any one of the above embodiments, the conductive layer directly contacts the transparent substrate and the black matrix layer, and has plural lateral sides and a bottom, which are covered by the black matrix layer.

14. In a display apparatus of any one of the above embodiments, the transparent matrix layer includes a first transparent conductive layer, and directly contacts the transparent substrate.

15. In a display apparatus of any one of the above embodiments, the conductive layer includes one of a second transparent conductive layer and a metal layer.

16. In a display apparatus of any one of the above embodiments, each of the first and the second transparent conductive layers contains a material being one selected from a group consisting of an ITO, an indium oxide, a tin oxide, a zinc oxide and a combination thereof.

17. A display apparatus of any one of the above embodiments comprises a horizontal electric field driving liquid crystal display device including one of a fringe field switching liquid crystal display device and an in-plane switching liquid crystal display device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display apparatus, comprising:
   a transparent substrate;
   a transparent matrix layer disposed above the transparent substrate;
   a black matrix layer disposed below the transparent substrate; and
   a conductive layer disposed between the transparent substrate and the black matrix layer.

2. A display apparatus of claim 1, wherein:
   the transparent substrate includes one of a glass substrate and a plastic substrate;
   the conductive layer directly contacts the transparent substrate and the black matrix layer, and has plural lateral sides and a bottom, which are covered by the black matrix layer; and
   the display apparatus comprises a horizontal electric field driving liquid crystal display device including one of a fringe field switching liquid crystal display device and an in-plane switching liquid crystal display device.

3. A display apparatus of claim 1, wherein:
   the transparent matrix layer includes a first transparent conductive layer, and directly contacts the transparent substrate; and
   the conductive layer includes one of a second transparent conductive layer and a metal layer, wherein each of the first and the second transparent conductive layers contains a material being one selected from a group consisting of an indium tin oxide (ITO), an indium oxide, a tin oxide, a zinc oxide and a combination thereof.

4. A display apparatus of claim 1, further comprising a touch sensing structure disposed above the transparent substrate so that the display apparatus provides a touch control function, wherein the touch sensing structure includes the transparent matrix layer.

5. A display apparatus of claim 1, wherein the black matrix layer has a vacancy therein, and the display apparatus further comprises:
   a color filter disposed below the transparent substrate and in the vacancy of the black matrix layer, and directly contacting the transparent substrate;
   a cover layer disposed below and directly contacting the color filter and the black matrix layer; and
   a liquid crystal cell disposed below the cover layer.

6. A display apparatus of claim 1, having an edge and further comprising:
   a conductive object disposed at the edge, contacting the conductive layer, electrically grounded, and including one selected from a group consisting of a gold pellet, a silver pellet, a tin pellet, a silver paste, a transparent conductive glue and a combination thereof.

7. A display apparatus, comprising:
a transparent substrate;
a black matrix layer having a profile; and
a conductive layer disposed between the transparent substrate and the black matrix layer, directly contacting the transparent substrate, and having a projection onto the black matrix layer, wherein the projection has a profile disposed within that of the black matrix layer.

8. A display apparatus of claim 7, further comprising:
a transparent matrix layer disposed above the transparent substrate; and
a touch sensing structure disposed above the transparent substrate and including the transparent matrix layer so that the display apparatus provides a touch control function.

9. A display apparatus of claim 7, wherein:
the transparent substrate includes one of a glass substrate and a plastic substrate; and
the conductive layer directly contacts the transparent substrate and the black matrix layer, and has plural lateral sides and a bottom, which are covered by the black matrix layer.

10. A display apparatus of claim 7, wherein:
the transparent matrix layer includes a first transparent conductive layer, and directly contacts the transparent substrate; and
the conductive layer includes one of a second transparent conductive layer and a metal layer, wherein each of the first and the second transparent conductive layers contains a material being one selected from a group consisting of an ITO, an indium oxide, a tin oxide, a zinc oxide and a combination thereof.

11. A display apparatus of claim 7, comprising a horizontal electric field driving liquid crystal display device including one of a fringe field switching liquid crystal display device and an in-plane switching liquid crystal display device.

12. A display apparatus of claim 7, wherein the black matrix layer has a vacancy therein, and the display apparatus further comprises:
a color filter disposed below the transparent substrate and in the vacancy of the black matrix layer, and directly contacting the transparent substrate;
a cover layer disposed below and directly contacting the color filter and the black matrix layer; and
a liquid crystal cell disposed below the cover layer.

13. A display apparatus of claim 7, having an edge and further comprising:
a conductive object disposed at the edge, contacting the conductive layer, electrically grounded, and including one selected from a group consisting of a gold pellet, a silver pellet, a tin pellet, a silver paste, a transparent conductive glue and a combination thereof.

14. A display apparatus, comprising:
a transparent substrate;
a black matrix layer; and
a conductive matrix layer disposed between the transparent substrate and the black matrix layer, and directly contacting the transparent substrate.

15. A display apparatus of claim 14, further comprising:
a transparent matrix layer disposed above the transparent substrate; and
a touch sensing structure disposed above the transparent substrate and including the transparent matrix layer so that the display apparatus provides a touch control function.

16. A display apparatus of claim 14, wherein the black matrix layer has a vacancy therein, and the display apparatus further comprises:
a color filter disposed below the transparent substrate and in the vacancy of the black matrix layer, and directly contacting the transparent substrate;
a cover layer disposed below and directly contacting the color filter and the black matrix layer; and
a liquid crystal cell disposed below the cover layer.

17. A display apparatus of claim 14, having an edge and further comprising:
a conductive object disposed at the edge, contacting the conductive layer, electrically grounded, and including one selected from a group consisting of a gold pellet, a silver pellet, a tin pellet, a silver paste, a transparent conductive glue and a combination thereof.

18. A display apparatus of claim 14, wherein:
the transparent substrate includes one of a glass substrate and a plastic substrate; and
the conductive layer directly contacts the transparent substrate and the black matrix layer, and has plural lateral sides and a bottom, which are covered by the black matrix layer.

19. A display apparatus of claim 14, wherein:
the transparent matrix layer includes a first transparent conductive layer, and directly contacts the transparent substrate; and
the conductive layer includes one of a second transparent conductive layer and a metal layer, wherein each of the first and the second transparent conductive layers contains a material being one selected from a group consisting of an ITO, an indium oxide, a tin oxide, a zinc oxide and a combination thereof.

20. A display apparatus of claim 14, comprising a horizontal electric field driving liquid crystal display device including one of a fringe field switching liquid crystal display device and an in-plane switching liquid crystal display device.

* * * * *